(12) United States Patent
Kodama et al.

(10) Patent No.: US 8,434,877 B2
(45) Date of Patent: May 7, 2013

(54) ILLUMINATION OPTICAL SYSTEM AND PROJECTION DISPLAY APPARATUS

(75) Inventors: Hiroyuki Kodama, Utsunomiya (JP); Takashi Sudo, Utsunomiya (JP); Yuuki Maeda, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 279 days.

(21) Appl. No.: 12/852,331

(22) Filed: Aug. 6, 2010

(65) Prior Publication Data

US 2011/0043767 A1 Feb. 24, 2011

(30) Foreign Application Priority Data

Aug. 20, 2009 (JP) .................................. 2009-191191

(51) Int. Cl.
*G03B 21/26* (2006.01)
*G03B 21/28* (2006.01)
*G02B 27/14* (2006.01)

(52) U.S. Cl.
USPC ............................... 353/94; 353/98; 359/636

(58) Field of Classification Search ............. 353/94, 353/98, 99, 81; 359/629, 636, 638, 639, 359/640, 833; 362/236, 241, 244, 296.01, 362/346, 327, 341
See application file for complete search history.

(56) References Cited

U.S. PATENT DOCUMENTS

| 6,109,752 A | 8/2000 | Itoh et al. |
| 2006/0033416 A1* | 2/2006 | Sawada ..................... 313/318.01 |
| 2006/0072074 A1* | 4/2006 | Matsui et al. .................. 353/20 |
| 2007/0297173 A1* | 12/2007 | Wang ............................ 362/241 |
| 2008/0218704 A1 | 9/2008 | Yagyu |

FOREIGN PATENT DOCUMENTS

| EP | 1538832 A2 | 6/2005 |
| EP | 2154567 A1 | 2/2010 |
| JP | 2000-321529 A | 11/2000 |
| JP | 2001021996 A | 1/2001 |
| JP | 2001-125198 A | 5/2001 |
| JP | 3992053 B2 | 10/2007 |
| WO | 2008155899 A1 | 12/2008 |

\* cited by examiner

*Primary Examiner* — William C Dowling
*Assistant Examiner* — Ryan Howard
(74) *Attorney, Agent, or Firm* — Canon U.S.A., Inc. IP Division

(57) ABSTRACT

An illumination optical system and a projection display apparatus include a beam combining portion and a condensing lens condensing a beam from the beam combining portion. The beam combining portion combines beams from first and second lamp units each including a lamp and a concave mirror, the lamp having a cathode and an anode arranged along an optical axis of the concave mirror. The beam combining portion includes a first reflective section disposed on an optical axis of the first lamp unit and off the optical axis of the second lamp unit and a second reflective section disposed off the optical axis of the first lamp unit. The first and second reflective sections reflect a beam that is emitted from the second lamp unit and that is off an optical axis thereof to combine the beams from the first and second lamp units.

16 Claims, 12 Drawing Sheets

REFLECTIVE SECTION

TRANSMISSIVE SECTION

ILLUMINATION OPTICAL SYSTEM AND PROJECTION DISPLAY APPARATUS

BACKGROUND OF THE INVENTION

1. Field of the Invention

The present invention relates to illumination optical systems and, in particular, to an illumination optical system that illuminates an illumination target surface using a plurality of lamp units.

2. Description of the Related Art

Some illumination optical systems in recent projection display apparatuses use a plurality of lamp units for illuminating an illumination target surface to illuminate it more brightly and obtain irradiance uniformity. The use of a plurality of lamp units in a projection apparatus implies an increase in size of such an apparatus. Meanwhile, miniaturization of a projection display apparatus itself has become an important factor in the current state of the art. Accordingly, there are approaches to narrowing the width of light emitted from a plurality of lamp units.

The invention described in English abstract of Japanese Patent No. 3,992,053 relates to an illumination optical system that combines beams of two lamp units each containing a light-source lamp and a reflector. A large quantity of light in a central portion including the optical axis of the lamp in a light quantity distribution curve of light is emitted from each of the lamp units. Specifically, beams in the central portion containing the optical axes of the lamps emitted from the two lamp units are extracted using a plurality of reflecting mirrors, and they are combined into combined light having substantially the same width of an aperture edge of one lamp unit.

In the configuration disclosed in English abstract of Japanese Patent No. 3,992,053, a beam corresponding to a bright portion is reflected so as to be present in an outer section of combined light, thus resulting in a large quantity of light in the outer section of the combined light. When the combined light is condensed through a fly's eye lens or a condensing lens to illuminate an image modulation element being an illumination target surface, the ratio of incident light with a large angle of incidence to all light incident on an image modulation element is large. As a result, image contrast deteriorates.

SUMMARY OF THE INVENTION

The present invention provides an illumination optical system and a projection display apparatus that are capable of displaying an image brightly with high contrast by reducing the ratio of incident light with a large angle of incidence to all light incident on an image modulation element.

According to an aspect of the present invention, an illumination optical system illuminates an image modulation element. The illumination optical system includes a beam combining portion and a condensing lens. The beam combining portion combines a beam emitted from a first lamp unit and a beam emitted from a second lamp unit, the first and second lamp units each including a lamp and a concave mirror, the lamp having a cathode and an anode arranged along an optical axis of the concave mirror. The condensing lens condenses a beam from the beam combining portion. The beam combining portion includes a first reflective section disposed on an optical axis of the first lamp unit and off an optical axis of the second lamp unit and a second reflective section disposed off the optical axis of the first lamp unit. The first reflective section and the second reflective section reflect the beam emitted from the second lamp unit and being off the optical axis thereof to combine the beams emitted from the first and second lamp units.

Further features of the present invention will become apparent those of ordinary skill in the art from the following description of exemplary embodiments with reference to the attached drawings.

DESCRIPTION OF THE EMBODIMENTS

First Embodiment

Figure 1:
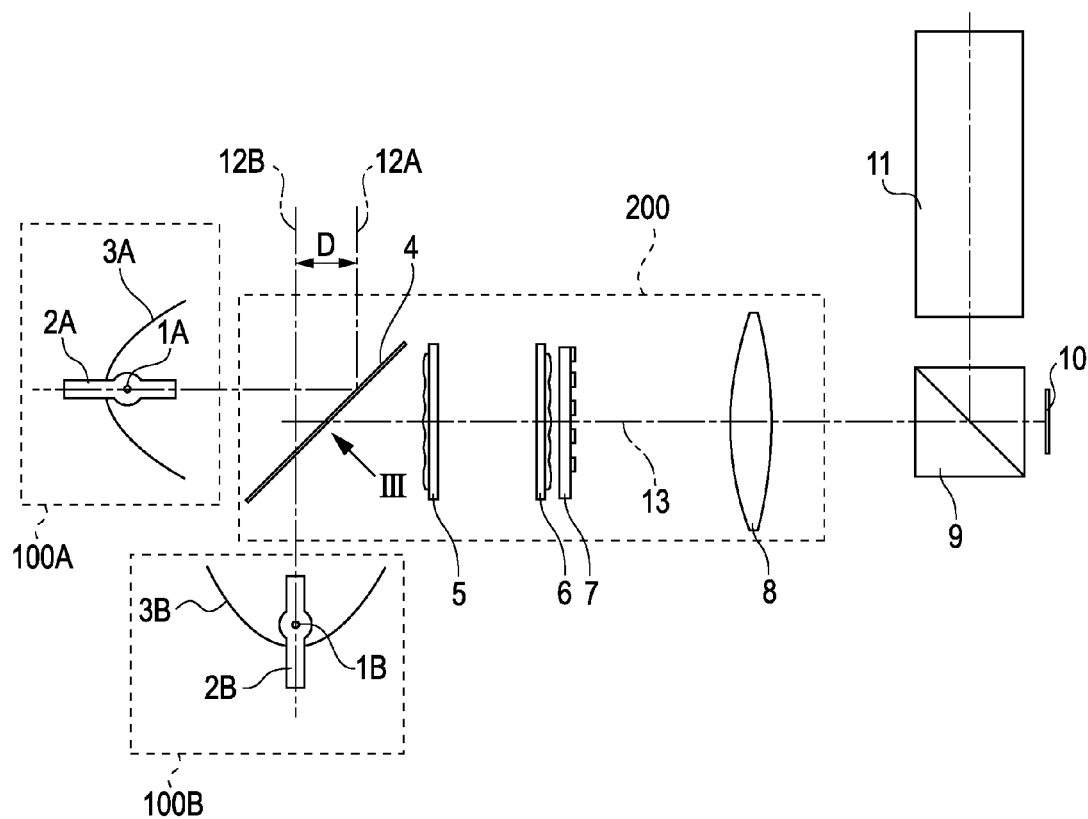
FIG. 1 illustrates a configuration according to a first embodiment.

A configuration according to a first embodiment of the present invention is described with reference to FIG. 1. A light emitting portion 1A has a cathode and an anode. The light emitting portion 1A is incorporated in a light emitting tube 2A. A parabolic mirror (concave mirror) 3A reflects a beam emitted from the light emitting portion 1A and guides it in a specific direction. The light emitting portion 1A emits a beam in wavelength regions of visible radiation. The cathode and the anode inside the light emitting tube 2A are arranged along the optical axis of the parabolic mirror 3A. The parabolic mirror 3A has the focal length f (0<f). The light emitting portion 1A is disposed in the vicinity of the focus of the parabolic mirror 3A. The light emitting portion 1A, the light emitting tube 2A, and the parabolic mirror 3A are included in a first lamp unit 100A. Similarly, a light emitting portion 1B having a cathode and an anode, a light emitting tube 2B incorporating the light emitting portion 1B, and a parabolic mirror (concave mirror) 3B are included in a second lamp unit 100B.

A combining mirror (beam combining portion or optical combiner) 4 combines beams emitted from the first lamp unit 100A and the second lamp unit 100B. The designation of terms "first" and "second" are used for ease of illustration only, and are not intended to indicate a specific order. Accordingly, for the remaining of the description and claims, these terms may be interchanged or not used.

An optical axis 12A of the first lamp unit 100A reflected by the combining mirror 4 and an optical axis 12B of the second lamp unit 100B passing through the combining mirror 4 are spaced apart by a distance D. In other words, as illustrated in FIG. 1, the distance D indicates the distance between optical axes of the lamp units seen from a reflected-light side of light from one of the lamp units. The reflected light is reflected by the combining mirror 4. Alternatively, the distance D represents the distance between the optical axes of the lamp units seen from a transmission side of light emitted from the other lamp unit. Accordingly, it should be note that for the remainder of the following description one of the optical axes of the lamp units is considered to be reflected by the combining mirror and the other of the optical axis of the lamp units is considered to pass through the combining mirror.

The first lamp unit 100A is arranged such that its optical axis 12A is at an approximately 45-degree angle with respect to the combining mirror 4. The second lamp unit 100B is arranged substantially orthogonal to the first lamp unit 100A, and is also arranged such that its optical axis 12B is at an approximately 45-degree angle with respect to the combining mirror 4. The combining mirror 4 is arranged such that the distance D between the optical axis 12A of the first lamp unit 100A (reflected by the combining mirror 4) and the optical axis 12B of the second lamp unit 100B (passing through the combining mirror 4) satisfies 0<D<4f, where f is the focal length of either one of the parabolic mirrors 3A and 3B. The reason this condition is described below in greater detail.

Each of a first fly's eye lens 5 and a second fly's eye lens 6 are a lens array in which minute spherical lenses are two-dimensionally arranged. A polarization conversion element 7 converts unpolarized light into substantially linearly polarized light.

The combining mirror 4, the first fly's eye lens 5, the second fly's eye lens 6, the polarization conversion element 7, and a condensing lens 8 are included in an illumination optical system 200 along an optical axis 13.

Combined light output from the combining mirror 4 is divided into beams and the beams are condensed by the first fly's eye lens 5. The beams are condensed in the vicinity of the second fly's eye lens 6. The beams condensed in the vicinity of the second fly's eye lens 6 enter the polarization conversion element 7 and are converted into respective substantially linearly polarized beams. The beams converted by the polarization conversion element 7 are condensed by the condensing lens 8, pass through a polarizing beam splitter 9, and are superimposed by a liquid-crystal display element (image modulation element) 10. In the case of full-white displaying, p-polarized light entering the liquid-crystal display element 10 is modulated into s-polarized light. The s-polarized light is reflected at a polarization separating surface of the polarizing beam splitter 9. The reflected light reaches a projection lens (projection optical system) 11, and an enlarged image is projected on a projected plane of, for example, a screen.

The above-described illumination optical system performs köhler illumination. The light emitting portions 1A and 1B and the second fly's eye lens 6 are disposed at conjugate positions. The first fly's eye lens 5 and the liquid-crystal display element 10 are also disposed at conjugate positions.

Next, an illuminance distribution of beams emitted from each lamp unit is described.

An illuminance distribution at an aperture plane of each of the first lamp unit 100A and the second lamp unit 100B is described with reference to FIGS. 2A, 2B, and 2C.

Figure 2A:
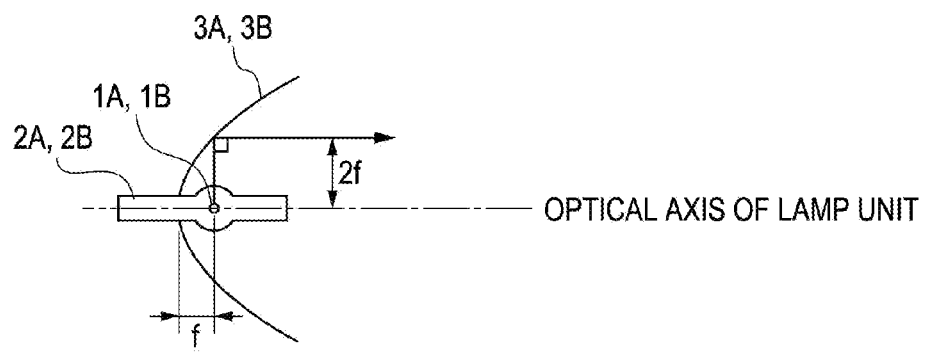
FIGS. 2A to 2C illustrate an illuminance distribution at an aperture plane of a lamp unit.

FIG. 2A illustrates beams emitted from the first lamp unit 100A or the second lamp unit 100B. The description of components having the same reference numerals as in the lamp units illustrated in FIG. 1 is omitted. Beams emitted from the light emitting portions 1A and 1B disposed in the vicinity of the parabolic mirrors 3A and 3B, respectively, are reflected at the parabolic mirror and are output to the aperture plane of the parabolic mirror as substantially parallel beams. Of light emitted from the light emitting portion, a beam reflected by the parabolic mirror at a position at which the distance to the optical axis of the lamp unit is $2f$ is indicated by the line with the arrow. In other words, it is a beam emitted from the light emitting portion 1A or 1B in the direction of approximately 90 degrees with respect (orthogonal) to the optical axis of the lamp unit.

Figure 2B:
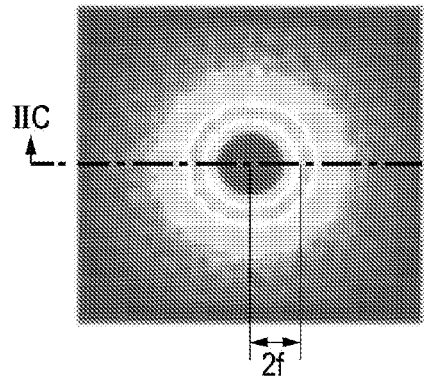

FIG. 2B illustrates a gray-scale image of an illuminance distribution at the aperture plane of the lamp unit. FIG. 2B reveals that the illuminance distribution of beams emitted from the lamp unit is annular.

Figure 2C:
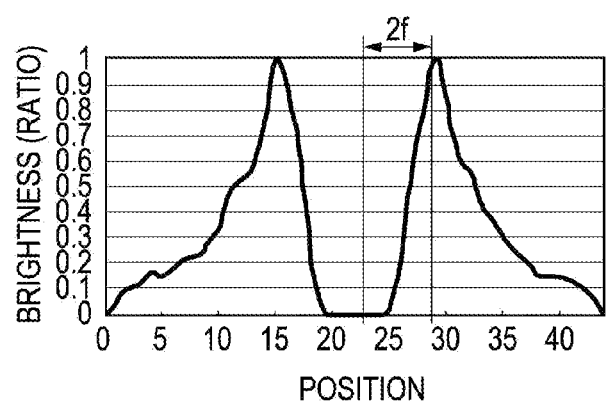

FIG. 2C illustrates a light quantity distribution (intensity distribution) at a cross section IIC of FIG. 2B. The cross-section IIC is the same as a plane that passes through the optical axis 12A of the first lamp unit 100A or the optical axis 12B of the second lamp unit 100B. The horizontal axis of the graph of FIG. 2C indicates the position along the intensity distribution of light emitted from a lamp unit, and the vertical axis indicates brightness in arbitrary units. The brightness of the vertical axis represents the ratio of 1 (highest intensity), at the position of the intensity distribution where the brightest portion is located. This light quantity distribution graph reveals that, in the cross section IIC, the light quantity is significantly low in the vicinity of the optical axis of the lamp unit and is highest in the vicinity of the position spaced away from the optical axis of the lamp unit by the radius $2f$. Hereinafter, the position where the highest light quantity is concentrated in the light quantity distribution is referred to as a peak. The beam corresponding to that peak is indicated by the line with the arrow illustrated in FIG. 2A. Accordingly, from FIG. 2C, it can be seen that a beam emitted from a given lamp unit is off the optical axis thereof.

A factor of a small light quantity (low intensity) in the vicinity of the optical axis of the lamp unit is that a hole of the parabolic mirror for use in arranging the light emitting tube 2A or 2B or the light emitting tube 2A or 2B itself serves as a light-shielding portion for emitted light.

The light quantity distribution illustrated in FIG. 2C can be obtained at positions other than the cross section IIC. For example, a similar light quantity distribution may be obtained at a cross-section on a line that intersects the optical axis of the lamp unit on the aperture plane of the lamp unit.

Next, a shape of the combining mirror 4 for combining beams emitted from the lamp units is described with reference to FIG. 3.

Figure 3:
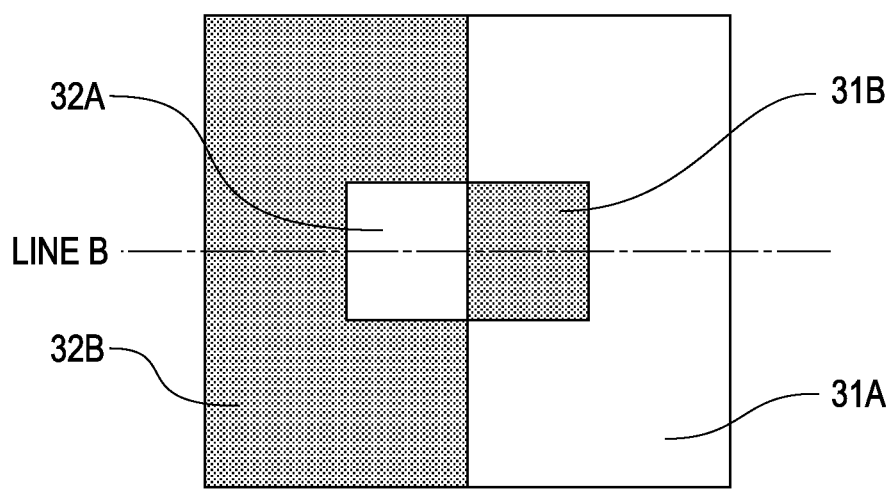
FIG. 3 illustrates a shape of a combining mirror according to the first embodiment.
Figure 3:
Figure 3:

FIG. 3 illustrates the combining mirror 4 as seen from the III direction indicated by the arrow illustrated in FIG. 1.

The combining mirror 4 according to the present embodiment is made of a single glass plate and includes a reflective section and a transmissive section. The reflective section is indicated by the dark-gray section, and the transmissive section is indicated by the clear section.

In FIG. 3, line B indicates a line along which a plane that passes through both of the optical axis 12A of the first lamp unit 100A (FIG. 1) and the optical axis 12B of the second lamp unit 100B (FIG. 1) intersects the combining mirror 4.

The combining mirror 4 includes a first transmissive section 31A, a first reflective section 31B, a second transmissive section 32A, and a second reflective section 32B arranged in this order from a first end to a second end, for this drawing, from the right to left, along the line B. The first reflective section 31B is present on the optical axis 12A of the first lamp unit 100A (FIG. 1), and the second transmissive section 32A is present on the optical axis 12B of the second lamp unit 100B (FIG. 1).

The shape of each of the first reflective section 31B, the first transmissive section 31A, the second reflective section 32B, and the second transmissive section 32A of the combining mirror 4 is not limited to the one illustrated in FIG. 3. The first reflective section 31B or the second transmissive section 32A may have a substantially semicircle shape corresponding to the annular shape of the illuminance distribution of emitted beams. Alternatively, it is not necessary for the first reflective section 31B and the second transmissive section 32A to share one side thereof; they may be separated from each other.

Figure 4:
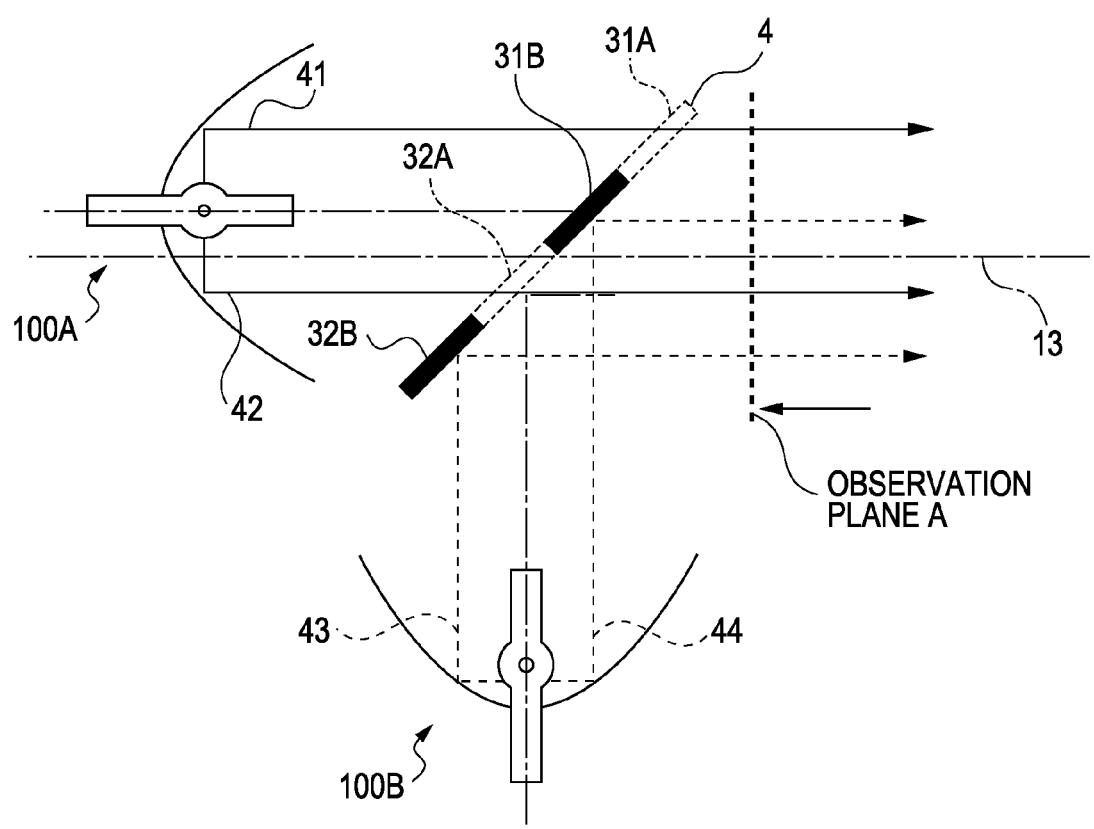
FIG. 4 illustrates operation of a beam combining portion.

Next, operation occurring when the above-described combining mirror 4 is used in an illumination optical system 200 to combine light beams emitted from lamps units 100A and 100B is described with reference to FIG. 4. FIG. 4 illustrates the two lamp units 100A and 100B arranged substantially orthogonal to each other and the combining mirror 4 arranged along optical axis 13 of the illumination optical system 200. The same reference numerals are used in components previously described, and the description thereof is omitted. For the sake of simplifying the description, the combining mirror 4 is illustrated in FIG. 4 such that its cross-section taken along the line B in FIG. 3 is shown. The dark sections of the combining mirror 4 are the reflective sections, whereas the sections surrounded by the dotted lines are the transmissive sections. As previously described, the combining mirror 4 (beam combining portion) includes the first transmissive section 31A, the first reflective section 31B, the second transmissive section 32A, and the second reflective section 32B arranged in this order from a first end to a second end. Beams 41 and 42 indicated by the solid-line arrows correspond to two peaks of the first lamp unit 100A, whereas beams 43 and 44 indicated by the dotted-line arrows correspond to two peaks of the second lamp unit 100B.

Referring the reflective sections of the combining mirror 4, it is noted that the first reflective section 31B is disposed on the optical axis of the first lamp unit 100A and off the optical axis of the second lamp unit 100B. The second reflective section 32B is off the optical axis of the first lamp unit 100A. The first reflective section 31B and the second reflective section 32B reflect light that is emitted from the second lamp unit 100B and that is off the optical axis thereof, and the reflected light is combined with light emitted from the first lamp unit 100A. On the other hand, when referring to the transmissive sections of the combining mirror 4, the second transmissive section 32A is disposed on the optical axis of the second lamp unit 100B and off the optical axis of the first lamp unit 100A. The first transmissive section 31A is off the optical axis of the second lamp unit 100B. In other words, the second transmissive section 32A and the first transmissive section 31A transmit light that is emitted from the first lamp unit 100A and that is off the optical axis thereof, and the transmitted light is combined with light emitted from the second lamp unit 100B.

The above description is described on the basis of the light quantity distribution of beams emitted from the lamp units illustrated in FIGS. 2A, 2B, and 2C. Of the peaks of the light quantity distribution of beams emitted from the first lamp unit 100A, the first peak beam 41 and the second peak beam 42 are arranged in this order from top to bottom in the drawing. Of the peaks of the illuminance distribution of emitted light from the second lamp unit 100B, the third peak beam 43 and the fourth peak beam 44 are arranged in this order from left to right in the drawing. First, the first transmissive section 31A of the combining mirror 4 allows the first peak beam 41 of the first lamp unit 100A to be transmitted therethrough. The second transmissive section 32A on the optical axis of the second lamp unit 100B allows the second peak beam 42 of the first lamp unit 100A to be transmitted therethrough. The third peak beam 43 of the second lamp unit 100B is reflected by the second reflective section 32B. The fourth peak beam 44 of the second lamp unit 100B is reflected by the first reflective section 31B on the optical axis of the first lamp unit 100A. That is, as seen from an observation plane A illustrated in FIG. 4, beams from the lamp units are combined such that the first peak beam 41, the fourth peak beam 44, the second peak beam 42, and the third peak beam 43 are arranged in this order from top to bottom in the drawing. The observation plane A used here indicates a plane that is positioned immediately after an exit surface of the combining mirror 4. The observation plane A is substantially perpendicular to a plane containing the optical axis of the first lamp unit 100A and the optical axis of the second lamp unit 100B (where the optical axis of the second lamp unit 100B has been reflected by combining mirror 4). Stated in another manner, the observation plane A is substantially parallel to the liquid-crystal display element 10.

Each of the first transmissive section 31A and the second transmissive section 32A of the combining mirror 4 may be a transparent glass plate or a free-space aperture as long as it has the function of allowing light to be transmitted therethrough.

The above-described operation of the combining mirror 4 is described in further detail with reference to FIGS. 5A to 5F.

Figure 5A:
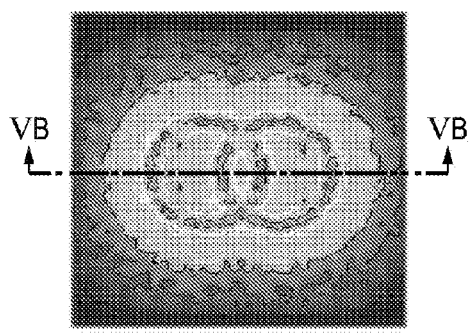
FIGS. 5A to 5F illustrate illuminance distributions after light passes through the combining mirror.
Figure 5B:
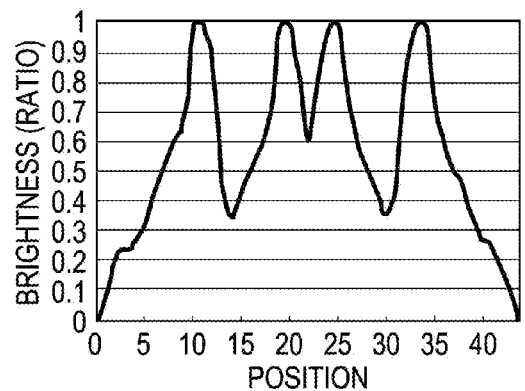

FIG. 5A shows an image of an illuminance distribution of combined light in the observation plane A (FIG. 4), and FIG. 5B illustrates a light quantity distribution at a cross section taken along the line VB-VB of FIG. 5A. These drawings reveal that the combining mirror 4 combines beams such that a bright portion is adjacent to the optical axis 13 of the illumination optical system 200 by having the reflective section provided in consideration of the light quantity distribution of beams emitted from the lamp units. The cross section used in FIG. 5B is obtained by cutting the illuminance distribution along a plane containing the optical axes of the first and second lamp units 100A and 100B, and the same applies to FIGS. 5D and 5F.

Figure 5C:
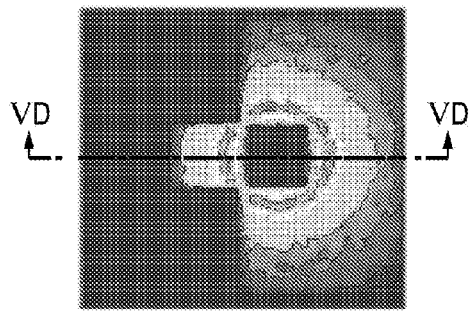
Figure 5D:
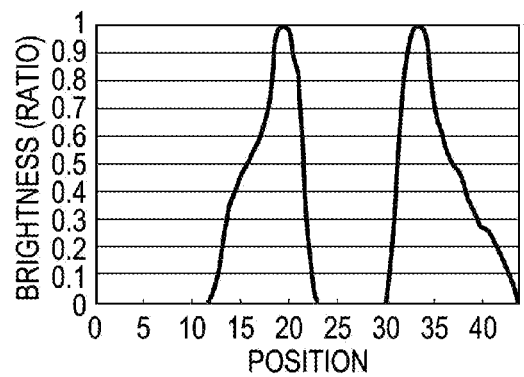
Figure 5E:
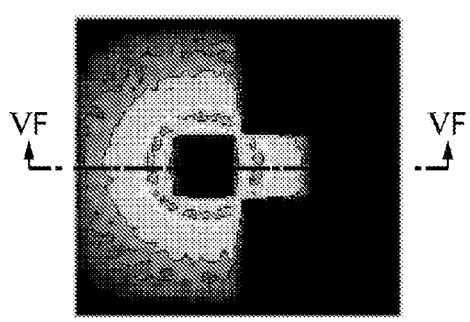
Figure 5F:
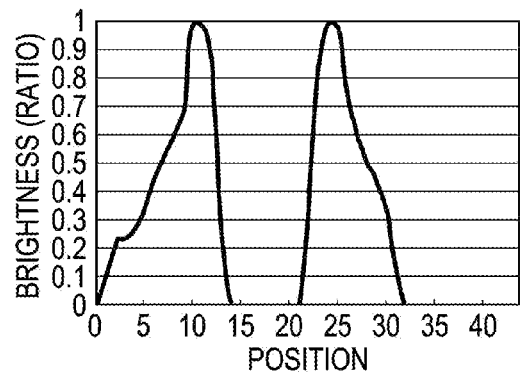

For reference purposes, FIG. 5C shows an image of an illuminance distribution in the observation plane A after beams pass through the combining mirror 4 when only the first lamp unit 100A (FIG. 4) is used in illumination, and FIG. 5D illustrates a light quantity distribution at a cross section taken along the line VD-VD of FIG. 5C. Similarly, FIG. 5E shows an image of an illuminance distribution in the observation plane A after beams pass through the combining mirror 4 when only the second lamp unit 100B is used in illumination, and FIG. 5F illustrates a light quantity distribution at a cross section taken along the line VF-VF of FIG. 5E.

Appropriately arranging the combining mirror 4 having the shape illustrated in FIG. 3 and the lamp units with reference to the combining mirror 4 enables beams to be combined such that a bright portion of beams that are emitted from the lamp units and that are off the optical axis thereof is adjacent to the optical axis of the illumination optical system. When the bright portion is adjacent to the optical axis of the illumination optical system, in condensing combined light using the condensing lens 8 (FIG. 1) and illuminating the liquid-crystal display element 10 (FIG. 1), the proportion of light obliquely incident on the liquid-crystal display element 10 can be reduced. A reduced proportion of obliquely incident light enables the liquid-crystal display element as the image modulation element to modulate a large quantity of light into an appropriate polarization state, so high image contrast can be achieved.

As described in the beginning, when the concave mirror is a parabolic mirror having the focal length f, it is useful that the distance D between the optical axes of the two lamp units satisfies 0<D<4f. This is because, when 0<D<4f, the beams corresponding to the peaks of the lamp units can be superimposed.

Preferably, the distance D may be set so as to satisfy f≦D≦3f. This enables beams to be combined such that a portion of a large quantity of light from a second lamp unit lies in a portion of a small quantity of light in the vicinity of the optical axis of a first lamp unit, so the liquid-crystal display element or other illumination target surfaces can be uniformly illuminated.

With a system that includes, in addition to the liquid-crystal display element 10, the polarizing beam splitter 9 disposed between the condensing lens 8 and the liquid-crystal display element 10, like the present embodiment, there are more advantageous effects in terms of bright illumination. This is because, if light with a large angle of incidence enters the polarization separating film of the polarizing beam splitter 9, which also has incident angle characteristics, light that should be transmitted would be reflected and the quantity of light entering the liquid-crystal display element 10 would be reduced.

For the present embodiment, a plane containing the optical axes 12A and 12B of the lamp units and a normal to the polarization separating surface of the polarizing beam splitter 9 are substantially parallel. However, they may not be in parallel.

For the first embodiment, a fly's eye lens is used as an integrator. However, the present invention is also applicable to an illumination optical system using a rod integrator. In this case, light combined by a combining mirror can be condensed so as to enter the rod integrator. Also in this case, high contrast can be achieved.

Here, quantitative effects are described below.

Figure 6:
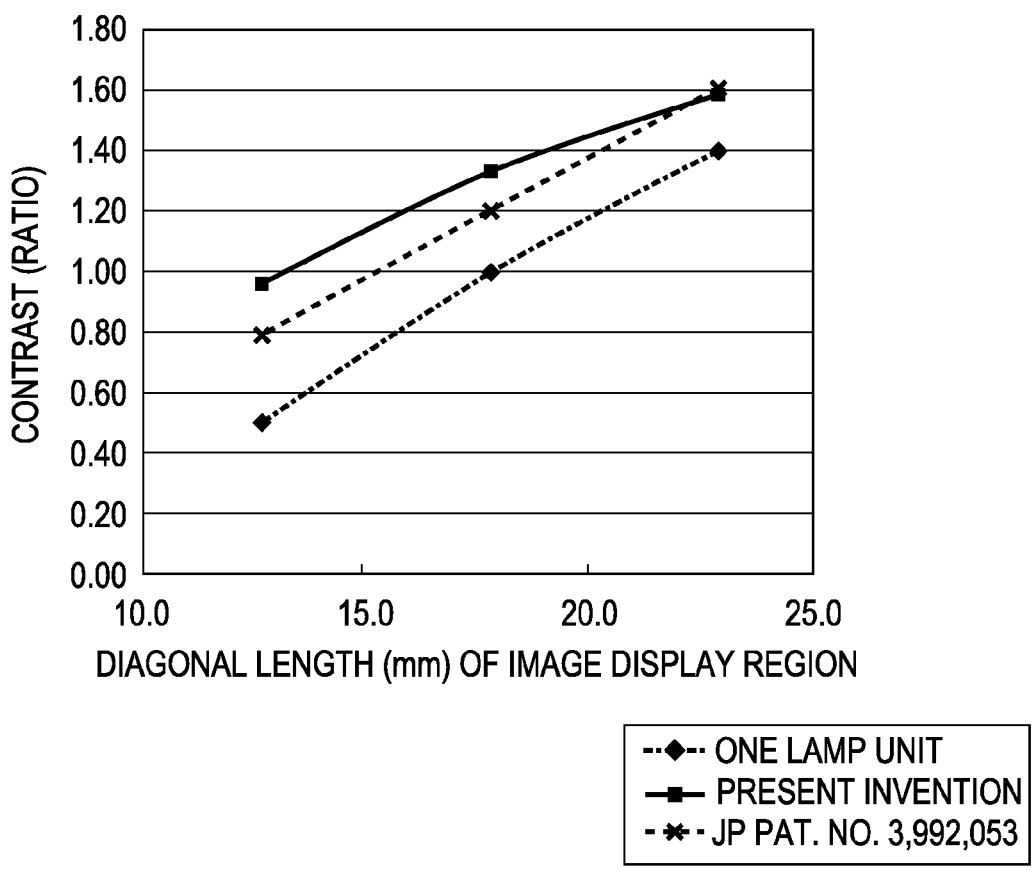
FIG. 6 is a graph that illustrates a relationship between a diagonal length of an image display region and contrast.

FIG. 6 is a graph that illustrates a relationship between the diagonal length of an image display region of the liquid-crystal display element 10 and contrast. The image display region is a region for use in actually displaying images in the liquid-crystal display element 10. The solid line indicates results for the configuration according to the first embodiment of the present invention; the dotted line indicates results for the configuration according to Japanese Patent No. 3,992, 053, which is mentioned above; and the alternate long and short dashed line indicates results for a configuration using one lamp unit. The horizontal axis denotes the diagonal length of the image display region of the liquid-crystal display element 10 in millimeters, and the vertical axis denotes the contrast. The contrast of the vertical axis is represented as the ratio to 1, where the brightness for a configuration in which the diagonal length of the liquid-crystal display element is approximately 17.8 mm and one lamp unit is used is 1. The brightness is constant for any of the systems, and the results were obtained with an arc length of the lamp of approximately 1.1 mm. The arc length of the lamp indicates the distance between the electrode of the anode and that of the cathode.

It is clear from the graph of FIG. 6 that the contrast according to the present embodiment is higher than the contrasts of the other systems. In particular, when the diagonal length of the liquid-crystal display element 10 is short, more advantageous effects are obtainable. This is because illuminating the liquid-crystal display element 10 having a short diagonal length involves an increased proportion of light obliquely incident on the liquid-crystal display element 10.

As described above, with the present embodiment, beams can be combined such that a bright portion is adjacent to the optical axis of the illumination optical system, so images can be displayed with high contrast.

For the present embodiment, the first and second lamp units 100A and 100B are arranged such that a plane containing the optical axes 12A and 12B thereof and a normal to the polarization separating surface of the polarizing beam splitter 9 are substantially parallel. However, the present invention is not limited to this configuration. Specifically, it is useful that the polarizing beam splitter 9 be rotated approximately 90 degrees about the optical axis 13 of the illumination optical system 200. In other words, it is useful that a plane containing a normal to the polarization separating surface of the polarizing beam splitter 9 and the optical axis 13 of the illumination optical system 200 and a plane containing the optical axes 12A and 12B of the first and second lamp units 100A and 100B be substantially perpendicular to each other. The same applies to variations described below.

Figure 7A:
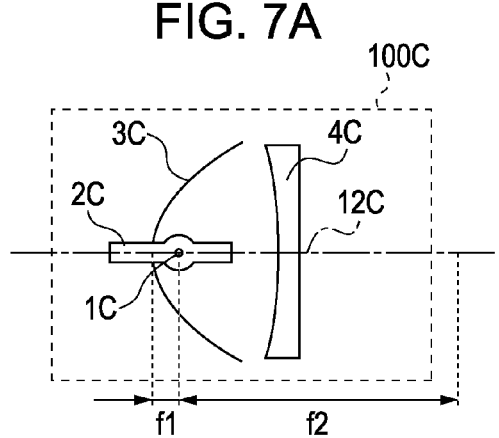
FIGS. 7A to 7C illustrate configurations according to variations of the first embodiment.

As one example with the parabolic mirror in the first embodiment being modified, a variation in which an elliptic mirror is used as the concave mirror is described with reference to FIG. 7A. The configuration other than a lamp unit using an elliptic mirror is substantially the same as the configuration according to the first embodiment (FIG. 1), so only the lamp unit is illustrated in FIG. 7A. A lamp unit 100C includes a light emitting portion 1C having a cathode and an anode, a light emitting tube 2C incorporating the light emitting portion 1C, an elliptic mirror 3C, and a concave lens 4C. The lamp unit 100C has an optical axis 12C. Here, the focal lengths of the elliptic mirror 3C are f1 and f2 (0<f1<f2). The light emitting portion 1C is disposed in the vicinity of the focuses of the elliptic mirror 3C.

With the above-described configuration, beams emitted from the light emitting portion 1C in vicinity of the focuses are reflected by the elliptic mirror 3C and condensed at the position corresponding to the focal length f2. The condensed beams are output by the concave lens 4C as substantially parallel beams. The output beams are combined by the combining mirror 4 illustrated in the first embodiment such that the peak of the light quantity distribution of each lamp unit is adjacent to the optical axis of the illumination optical system, so high-contrast illumination can be achieved.

As one example using an elliptic mirror as the concave mirror, a variation that uses an elliptic mirror having a long focal length f2 without using the concave lens 4C can be made.

When the elliptic mirror (concave mirror) has the focal lengths f1 and f2 (0<f1<f2), where the distance between the optical axes of the two lamp units is D, the lamp units 100C and the combining mirror 4 (FIG. 3) can be arranged such that 0<D<4×f1×f2/(f1+f2) is satisfied. This is because when 0<D<4×f1×f2/(f1+f2) is satisfied the beams corresponding to the peaks of light emitted from the lamp units can be superimposed.

Preferably, the distance D between the optical axes may be set such that f1×f2/(f1+f2)≦D≦3×f1×f2/(f1+f2) is satisfied. This enables a bright portion of light emitted from a second lamp unit to be appropriately combined with a portion of a small light quantity in the vicinity of a first lamp unit, so an illumination target surface can be illuminated more uniformly.

The concave mirror is not limited to a parabolic mirror or an elliptic mirror. Any concave mirror can be used as long as it can guide light emitted from a light emitting tube to a specific direction.

As an example with the combining mirror 4 in the first embodiment being modified, a variation in which a combining prism includes a reflective section at its joint surface is described with reference to FIG. 7B.

Figure 7B:
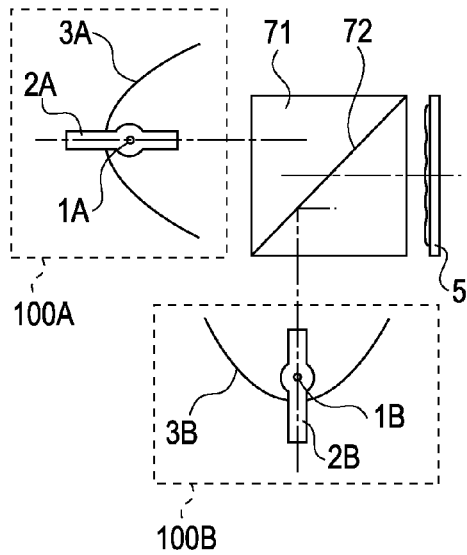

For the reference numerals illustrated in FIG. 7B, only 71 and 72, which are not illustrated in FIG. 1, are described.

A combining prism 71 is an example of the beam combining portion and includes a joint surface 72. The combining mirror 4 is used for combining beams emitted from the two lamp units 100A and 100B in the first embodiment. Alternatively, the combining prism 71 including the joint surface 72 provided with a reflective section having the same function as in the combining mirror 4 may also be used, as illustrated in FIG. 7B. With this, images can be displayed with high contrast, as in the case of the first embodiment.

The combining mirror 4 and the combining prism 71 for obtaining the advantageous effects of the present embodiment are not limited to the shapes described above. For example, the reflective section can have a substantially semicircular shape corresponding to a light quantity distribution of beams emitted from the lamp units. In this case, the shape is fitted for the illuminance distribution, so brighter illumination can be achieved.

As another variation of the first embodiment, a configuration in which a beam that was not used in combined light is returned to a parabolic mirror using a reflecting member is described with reference to FIG. 7C. For the reference numerals illustrated in FIG. 7C, only 73, which is not illustrated in FIG. 1, is described. A reflecting member 73 is disposed opposite to the second lamp unit 100B, and the combining mirror 4 is arranged between the reflecting member 73 and the second lamp unit 100B. The thick dotted line arrow indicates a partial beam that was emitted from the second lamp unit 100B, was not incident on the first or second reflective section of the combining mirror 4, and was not used in combined light. The beam that was not incident on the first or second reflective section of the combining mirror 4 is then reflected by the reflecting member 73 in substantially the same direction as the direction of the incident beam and is returned to the parabolic mirror 3B again, as indicated by a thin dotted line arrow. The beam returned to the parabolic mirror 3B is directed in the direction of the focus of the parabolic mirror 3B (the direction to the light emitting portion 1B), is reflected at a location different from the location at which the beam has been previously reflected, and is directed to the combining mirror 4 again. The beam directed to the combining mirror 4 is reflected by the reflective section of the combining mirror 4 and is used in combined light.

The provision of the above-described reflecting member 73 enables beams emitted from the lamp units to be effectively used, so the brightness of illumination can further increase.

Figure 7C:
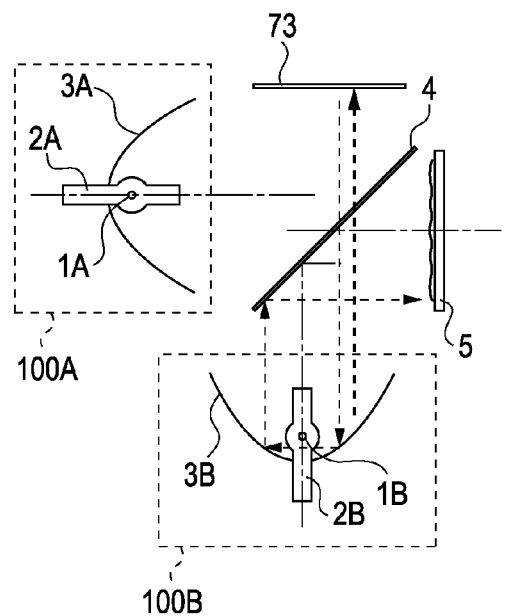

The position of the reflecting member 73 is not limited to that illustrated in FIG. 7C. For example, the reflecting member 73 may have a short length in the vertical direction in the drawing and may be arranged between the second lamp unit 100B and the combining mirror 4 or arranged in contact with the concave mirror. With such configurations, similar advantageous effects are obtainable.

Second Embodiment

Figure 8:
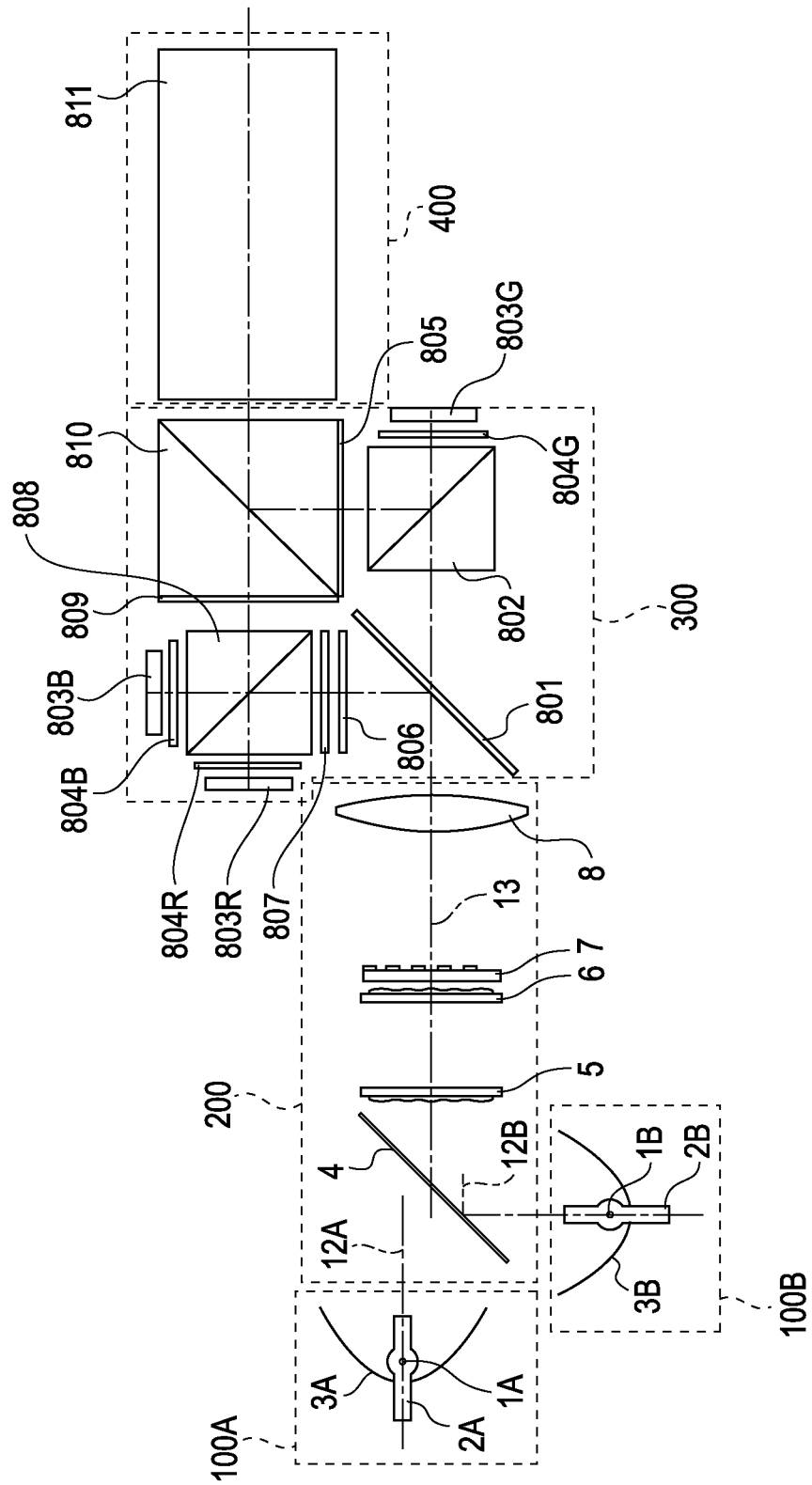
FIG. 8 illustrates a configuration according to a second embodiment.

FIG. 8 illustrates a projection display apparatus using three reflective liquid-crystal display elements for red (R), green (G), and blue (B) as an image modulation element.

In FIG. 8, the lamp units 100A and 100B and the illumination optical system 200 are the same as in the first embodiment, so the description thereof is omitted. Only different portions are described here.

Beams emitted from the light emitting portions 1A and 1B enter the illumination optical system 200, and their p-polarized light enters a dichroic mirror 801. The dichroic mirror 801 reflects light corresponding to blue (B) and red (R) and allows light corresponding to green (G) to be transmitted therethrough. A first polarizing beam splitter 802 allows p-polarized light to be transmitted therethrough and reflects s-polarized light and has a polarization separating surface.

Reflective liquid-crystal display elements 803R, 803G, and 803B reflect incident beams, perform image modulation, and correspond to red, green, and blue, respectively. Quarter-wave plates 804R, 804G, and 804B correspond to red, green, and blue, respectively. An exit side polarizer 805 allows s-polarized light of green light to be transmitted therethrough. An incident side polarizer 806 allows p-polarized light to be transmitted therethrough. A color selective retardation plate 807 rotates the direction of polarization of red light by approximately 90 degrees and does not rotate the direction of polarization of blue light. A second polarizing beam splitter 808 allows p-polarized light to be transmitted therethrough and reflects s-polarized light and has a polarization separating surface.

An exit side polarizer 809 deals with blue light and allows only s-polarized light of blue light to be transmitted therethrough; it allows red light to be transmitted therethrough irrespective of its polarization direction. A combining prism 810 has characteristics of the function of a dichroic mirror for blue and green light and the function of a polarizing beam splitter that allows p-polarized light of red light to be transmitted therethrough and reflects s-polarized light thereof. The components from the dichroic mirror 801 to the combining prism 810 described above are included in a color separation and combination optical system 300. A projection lens 811 serves as a projection optical system.

The projection display apparatus according to the second embodiment includes the lamp units 100A and 100B, the above-described illumination optical system 200, the color separation and combination optical system 300, and a projection optical system 400.

Combining beams from a plurality of lamp units using the combining mirror 4 in this projection display apparatus enables peaks of the lamp units of light quantity distributions to be concentrated in the vicinity of the optical axis of the illumination optical system. Therefore, image can be displayed with high contrast.

The second embodiment describes an example that uses three reflective liquid-crystal display elements. However, the number of reflective liquid-crystal display elements is not limited to three; it may be two or four, for example.

For the present embodiment, a plane that contains the optical axes 12A and 12B of the first and second lamp units and a color separation and combination surface (surface that contains light before being separated and light after being separated) of the color separation and combination optical system 300 are the same (or parallel). However, other configurations may be used. Specifically, it is useful that the plane that contains the optical axes 12A and 12B of the first and second lamp units and the color separation and combination surface of the color separation and combination optical system 300 may be substantially perpendicular to each other (the color separation and combination surface is substantially perpendicular to the sheet surface of FIG. 8). In other words, a plane that contains the color separation surface of the dichroic mirror 801, the polarization separating surface of each of the first and second polarizing beam splitters 802 and 808, a normal to the color combining surface of the combining prism 810, and the optical axis 13 of the illumination optical system 200 may be substantially perpendicular to a plane that contains the optical axes 12A and 12B of the first and second lamp units. It is useful that a plane containing a normal to the polarization separating surface of at least one of the first and second polarizing beam splitters 802 and 808 and the optical axis 13 of the illumination optical system 200 be substantially perpendicular to a plane that contains the optical axes 12A and 12B of the first and second lamp units. In further other words, a plane that contains the optical axis of each of the lamp units may be substantially perpendicular to a normal to at least one liquid-crystal display element.

A reflective liquid-crystal display element is used as an image modulation element. However, the present invention is not limited to a reflective liquid-crystal display element. In the drawings, for the sake of simplifying the description, the fundamental configuration of the projection display apparatus is illustrated; it may include other components, such as an infrared-ray cut filter and a polarizer.

Third Embodiment

Figure 9:
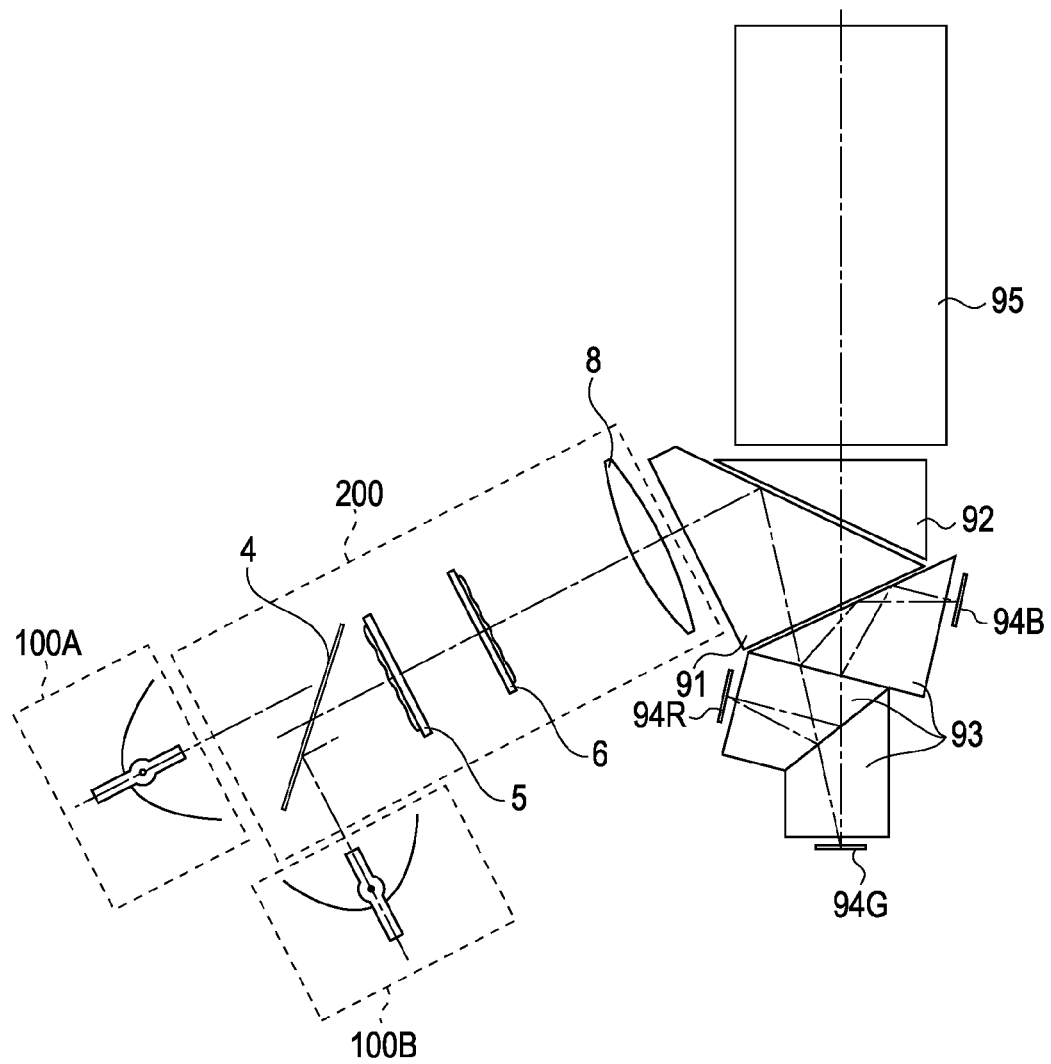
FIG. 9 illustrates a configuration according to a third embodiment.

The third embodiment is an example of a projection display apparatus that uses three micro-mirror devices (image modulation element) and is described with reference to FIG. 9.

The description of substantially the same configuration as in the first embodiment is omitted, and only different portions are described.

The lamp units 100A and 100B and the illumination optical system 200 are substantially the same as in the first embodiment.

Light combined by the combining mirror 4 from beams emitted from the lamp units 100A and 100B passes through the first fly's eye lens 5, the second fly's eye lens 6, and the condensing lens 8. Light output from the condensing lens 8 is fully reflected by a prism 91 and is guided to a color separation and combination prism 93. The color separation and combination prism 93 separates color light and guides separated light components to micro-mirror devices 94R, 94G, and 94B.

In white displaying, color light components reflected by the micro-mirror devices 94R, 94G, and 94B pass through the color separation and combination prism 93 for combining beams again. The combined light passes through a prism 92 and is directed to a projection lens (projection optical system) 95. White displaying used here indicates a state in which a projection display apparatus displays a white image on a projection target surface.

In black displaying, minute mirrors in each of the micro-mirror devices 94R, 94G, and 94B are tilted, so light having entering the micro-mirror devices 94R, 94G, and 94B through the illumination optical system 200 and the prism 91 is returned to the prism 91 and the illumination optical system 200 without entering the projection lens 95. Here, the direction in which beams entering the micro-mirror devices 94R, 94G, and 94B in black displaying is guided is not limited to the direction toward the illumination optical system 200 (toward the light source); it may be any direction that differs from the direction toward the projection lens 95.

Each of the micro-mirror devices changes the direction of reflection of incident light by changing the inclination of its minute mirrors to adjust brightness of pixels. Accordingly, if incident light is not incident at a proper angle, the light would not be reflected in a desired direction and contrast would degrade. The use of the beam combining portion (combining mirror 4) according to the present embodiment can reduce the proportion of obliquely incident light, so images can be displayed brightly with high contrast.

The present embodiment describes an example that uses three micro-mirror devices as an image modulation element. However, the number of micro-mirror devices may be one or two, for example.

In the foregoing, the embodiments of the present invention have been described. In addition to the above-described advantageous effects, with the present invention, an advantageous effect of illuminating an illumination target surface more brightly is obtainable. The technical details are described with reference to FIGS. 10, 11A, and 11B.

Figure 10:
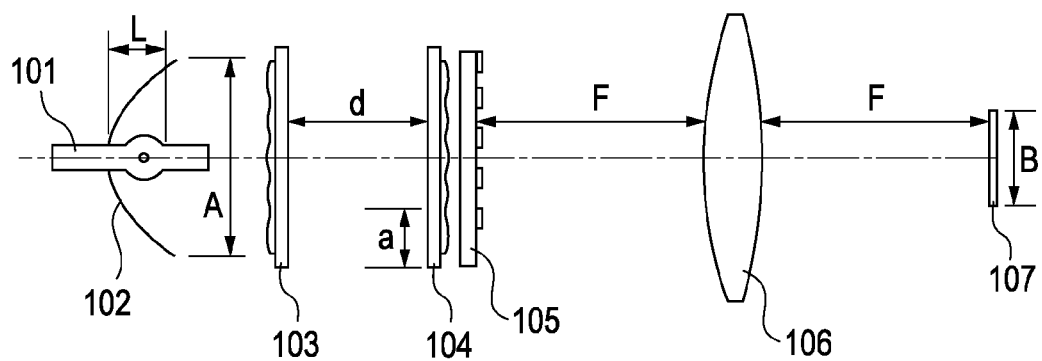
FIG. 10 illustrates a basic configuration from a lamp unit to a liquid-crystal display element.

FIG. 10 illustrates a basic configuration from a lamp unit to an image modulation element of a projection display apparatus. For the sake of simplifying the description, only the basic configuration is illustrated.

The projection display apparatus includes a lamp unit 102 including a lamp 101 and a parabolic mirror, a first fly's eye lens 103, a second fly's eye lens 104, a polarization conversion element 105, a condensing lens 106 having the focal length F, and a liquid-crystal display element 107 as an image modulation element.

Figure 11A:
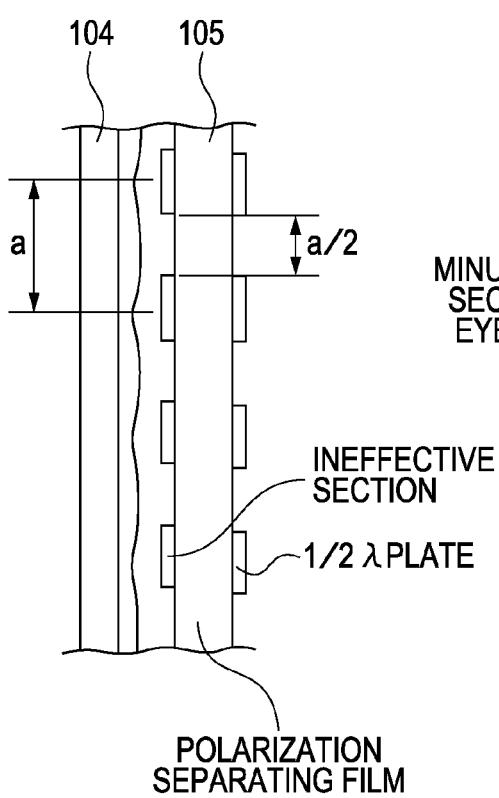
FIGS. 11A and 11B schematically illustrate a second fly's eye lens and a polarization conversion element.
Figure 11B:
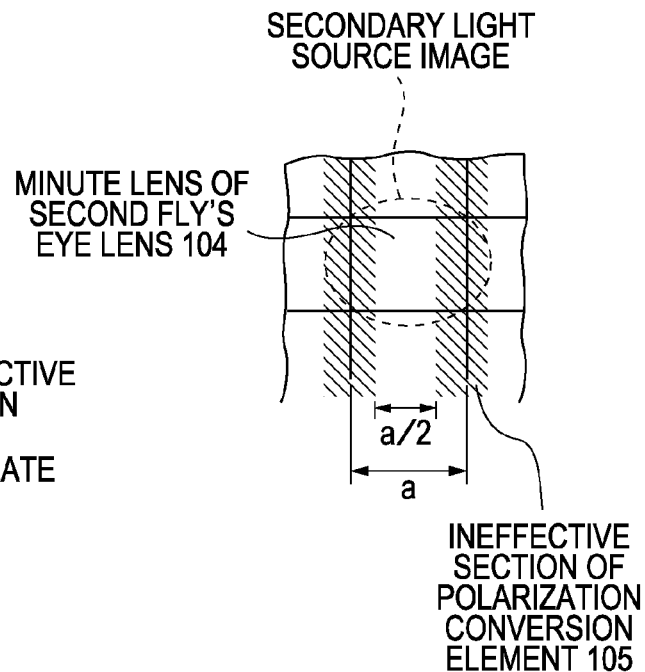

FIG. 11A is an enlarged schematic view of the second fly's eye lens 104 and the polarization conversion element 105 illustrated in FIG. 10. FIG. 11B is an enlarged schematic view of a part that contains a minute lens of the second fly's eye lens 104 illustrated in FIG. 11A.

Substantially parallel beams emitted from the lamp unit 102 illustrated in FIG. 10 are divided and collimated by the first fly's eye lens (in which minute spherical lenses are two-dimensionally arranged) 103. The divided beams are condensed in the vicinity of the second fly's eye lens 104 and form an image of the light source (secondary light source image). Each of the minute lenses included in the fly's eye lenses 103 and 104 has a substantially rectangular shape that is similar to the liquid-crystal display element being an illumination target surface (FIG. 11B). The divided beams output from the second fly's eye lens 104 are converted by the polarization conversion element 105 into substantially linearly polarized light. As illustrated in FIG. 11A, the polarization conversion element 105 includes polarization separating films arranged in rows. The divided beams converted into substantially linearly polarized light by the polarization conversion element 105 are condensed by the condensing lens 106 and superimposed on the liquid-crystal display element 107. The liquid-crystal display element 107 is typically substantially rectangular and is typically used such that it is horizontally oriented on a screen. In the specification, hereinafter, the direction along a long side of the image display region of the liquid-crystal display element (horizontal on the screen) is referred to as the long direction, and the direction along a short side thereof (vertical on the screen) is referred to as the short direction.

Here, the following relationship is approximately satisfied:

$$B = a \times (F/d) \qquad (1)$$

where a is the width of a minute lens included in the second fly's eye lens 104, d is the distance between the first fly's eye lens 103 and the second fly's eye lens 104, F is the focal length of the condensing lens 106, and B is the width of the liquid-crystal display element 107 in the short direction, as illustrated in FIGS. 10, 11A, and 11B.

An incident angle θ of light on the liquid-crystal display element 107 is represented by the following expression:

$$\theta = \tan^{-1}(A/2F) \qquad (2)$$

where A is the width of the aperture of the lamp unit 102.

In the system illustrated in FIG. 10, brightness of illumination largely depends on the size of an image of a light source formed in the vicinity of the second fly's eye lens 104 (secondary light source image), or alternatively, on the width a of the minute lens of the second fly's eye lens 104 and the distance between an effective section and an ineffective section arranged in rows (FIG. 11A) of the polarization conversion element 105.

A secondary light source image in the vicinity of the second fly's eye lens 104 is formed by the first fly's eye lens 103 condensing substantially parallel beams emitted from the lamp unit 102. Because of this, the size of the secondary light source image is substantially proportional to the focal length of the first fly's eye lens 103 or the distance d between the first fly's eye lens 103 and the second fly's eye lens 104.

Because a secondary light source image is formed by condensed beams emitted from the lamp in the lamp unit, when the arc length of the lamp in the lamp unit 102 is L, the size of the secondary light source image is also substantially proportional to the arc length L of the lamp in the lamp unit 102.

Accordingly, the size of the secondary light source image can be represented by the following expression using the arc length L of the lamp and the distance d between the first fly's eye lens and the second fly's eye lens:

$$\text{<Size of Secondary Light Source Image>} = \propto L \times d \quad (3)$$

The liquid-crystal display element 107 is illuminated with only light passing through a corresponding minute lens of the second fly's eye lens 104 and effective section of the polarization conversion element 105 out of light forming the secondary light source image. Therefore, as illustrated in FIG. 11B, brightness increases with a reduction in the size of a secondary light source image with respect to the width of a minute lens of the second fly's eye lens 104 and the width of one row of the polarization separating films arranged in rows of the polarization conversion element 105. In contrast, if the size of the secondary light source image is large, it extends off the region of the minute lens of the second fly's eye lens 104, or alternatively, it is subjected to vignetting by the ineffective section of the polarization conversion element 105, so brightness decreases.

Accordingly, the value obtained by dividing the width of a minute lens of the second fly's eye lens by the size of a secondary light source image can be a variable that represents brightness of illumination. The following relationship is satisfied:

$$\gamma \propto a/(L \times d) \quad (4)$$

where $\gamma$ is the value obtained by dividing the width of a minute lens of the second fly's eye lens by the size of a secondary light source image. That is, when $\gamma$ is large, brightness of illumination increases, whereas, in contrast, when $\gamma$ is small, it decreases.

From the expressions (1) and (2), the following relationship is satisfied:

$$\gamma \propto (2B \times \tan\theta)/A \times L \quad (5)$$

Because the light quantity distribution of beams emitted from the lamp unit 102 is not uniform, the expression (5) and brightness of illumination are not proportional. However, the expression (5) reveals that, when the width A of the aperture of the lamp unit and the arc length L of the lamp are large or the width B of the liquid-crystal display element is small, brightness decreases.

In other words, in order to maintain the contrast above a certain degree without changing the width B of the liquid-crystal display element, the width A of the aperture of the lamp unit, and the arc length L of the lamp, it is necessary to reduce the incident angle $\theta$ on the liquid-crystal display element 107. If the value of $\theta$ is reduced, the value of $\gamma$ is inevitably reduced because of the expression (5), so brightness decreases.

Next, quantitative effects relating to brightness according to the first embodiment are described below.

Figure 12:
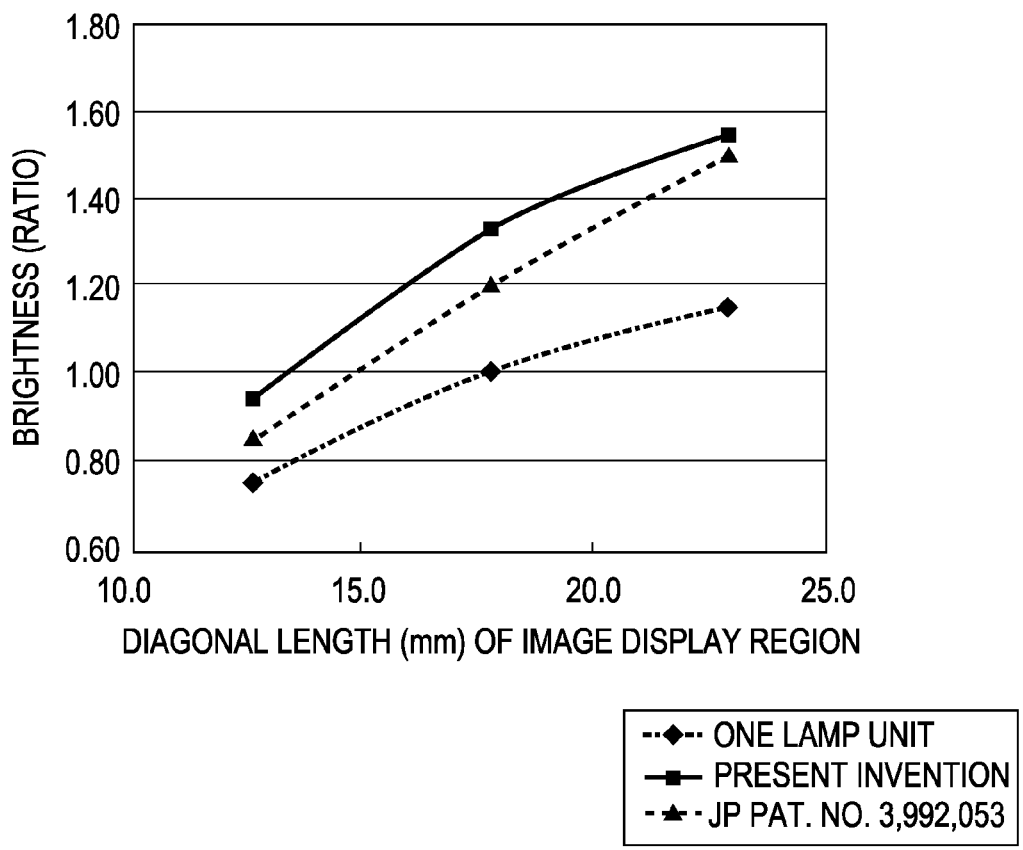
FIG. 12 is a graph that illustrates a relationship between a diagonal length of an image display region and brightness on a screen.

FIG. 12 is a graph that illustrates a relationship between the diagonal length of an image display region of the liquid-crystal display element 10 and brightness. The solid line indicates results for the configuration according to the first embodiment of the present invention; the dotted line indicates results for the configuration according to Japanese Patent No. 3,992,053, which is mentioned above; and the alternate long and short dashed line indicates results for a configuration using one lamp unit. The horizontal axis denotes the diagonal length of the image display region of the liquid-crystal display element 10 in millimeters, and the vertical axis denotes the brightness. The brightness of the vertical axis is represented as the ratio to 1, where the brightness for a configuration in which one lamp unit is used and the diagonal length of the liquid-crystal display element is approximately 17.8 mm is 1. The contrast is constant for any of the systems, and the results were obtained with an arc length of the lamp of approximately 1.1 mm.

The results illustrated in FIG. 12 reveal that the brightness of the present embodiment on a screen is higher than other systems. Preferably, $0<P/L<23$ may be satisfied, where L is the arc length of the lamp of the lamp unit along the optical axis and P is the diagonal length of the image display region of the liquid-crystal display element. This is because, with other systems, if the length of the light source is long or the diagonal length P of the image display region of the liquid-crystal display element is short, the quantity of light that does not enter the lens array or light that is subjected to vignetting by the ineffective section of the polarization conversion element would be increased.

With the present embodiment, a beam combining portion that combines beams emitted from a plurality of lamp units such that their bright portions are adjacent to the optical axis of an illumination optical system can be used. Accordingly, an illumination optical system and a projection display apparatus capable of brightly displaying a high-contrast image can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-191191 filed Aug. 20, 2009, which is hereby incorporated by reference herein in its entirety.

What is claimed is:

1. An illumination optical system that illuminates an image modulation element, the illumination optical system comprising:

a beam combining portion that combines a beam emitted from a first lamp unit and a beam emitted from a second lamp unit, the first and second lamp units each including a lamp and a concave mirror, each lamp having a cathode and an anode arranged along an optical axis of the concave mirror;

a lens array or a rod integrator through which a beam from the beam combining portion is transmitted; and a condensing lens that condenses the beam transmitted through lens array or the rod integrator, the beam combining portion including:
- a first reflective section disposed on an optical axis of the first lamp unit and off an optical axis of the second lamp unit; and
- a second reflective section disposed off the optical axis of the first lamp unit,
- wherein the first reflective section and the second reflective section reflect the beam emitted from the second lamp unit and being off the optical axis thereof to combine the beams emitted from the first and second lamp units, and
- wherein the optical axis of the first lamp unit is substantially perpendicular to the optical axis of the second lamp unit.

2. The illumination optical system according to claim 1, wherein the beam combining portion combines the beam emitted from the second lamp unit and reflected by the first reflective section and the second reflective section and the beam emitted from the first lamp unit and passing through between the first reflective section and the second reflective section.

3. The illumination optical system according to claim 1, wherein the beam combining portion further includes a first transmissive section and a second transmissive section, the second transmissive section being disposed on the optical axis of the second lamp unit,
- the first transmissive section, the first reflective section, the second transmissive section, and the second reflective section of the beam combining portion are arranged in this order from a first end to a second end, and
- when, in a cross section that contains the optical axis of the first lamp unit and the optical axis of the second lamp unit, two peaks of a light quantity distribution on a line that intersects the optical axis of the first lamp unit at an aperture plane of the first lamp unit are a first peak and a second peak and two peaks of a light quantity distribution on a line that intersects the optical axis of the second lamp unit at an aperture plane of the second lamp unit are a third peak and a fourth peak, the first transmissive section allows a beam corresponding to the first peak to be transmitted therethrough, the first reflective section reflects a beam corresponding to the fourth peak, the second transmissive section allows a beam corresponding to the second peak to be transmitted therethrough, and the second reflective section reflects a beam corresponding to the third peak.

4. The illumination optical system according to claim 1, further comprising a reflecting member,
- wherein the reflecting member returns a beam that is not incident on the first reflective section or the second reflective section to at least one of the first lamp unit and the second lamp unit.

5. The illumination optical system according to claim 1, further comprising a polarizing beam splitter disposed between the condensing lens and the image modulation element.

6. The illumination optical system according to claim 1, wherein the optical axis of the first lamp unit reflected by the beam combining portion and the optical axis of the second lamp unit passing through the beam combining portion are spaced apart from each other by a predetermined distance.

7. The illumination optical system according to claim 6, wherein, when the concave mirror is a parabolic mirror having a focal length f, the following relationship is satisfied:

$$0<D<4f$$

where D is the predetermined distance.

8. The illumination optical system according to claim 6, wherein, when the concave mirror is an elliptic mirror having focal lengths f1 and f2, where 0<f1<f2, the following relationship is satisfied:

$$0<D<4\times f1\times f2/(f1+f2)$$

where D is the predetermined distance.

9. An illumination optical system that illuminates an image modulation element, the illumination optical system comprising:
- a beam combining portion that combines a beam from a first lamp unit and a beam from a second lamp unit, the first and second lamp units each including a lamp and a concave mirror, each lamp having a cathode and an anode arranged along an optical axis of the concave mirror;
- a lens array or a rod integrator through which a beam from the beam combining portion is transmitter; and
- a condensing lens that condenses the beam transmitted through the lens array of the rod integrator,
- the beam combining portion including:
  - a reflective section disposed on an optical axis of the first lamp unit and off an optical axis of the second lamp unit, the reflective section reflecting a beam that is emitted from the second lamp unit and that is off the optical axis thereof; and
  - a transmissive section disposed on the optical axis of the second lamp unit and off the optical axis of the first lamp unit, the transmissive section allowing a beam that is emitted from the first lamp unit and that is off the optical axis thereof to be transmitted therethrough,
- wherein the reflective section and the transmissive section combine a beam emitted from the second lamp unit and reflected by the reflective section and a beam emitted from the first lamp unit and passing through the transmissive section.

10. A projection display apparatus comprising:
- an image modulation element;
- an illumination optical system that illuminates an image modulation element, the illumination optical system comprising:
- a beam combining portion that combines a beam emitted from a first lamp unit and a beam emitted from a second lamp unit, the first and second lamp units each including a lamp and concave mirror, each lamp having a cathode and an anode arranged along an optical axis of the concave mirror;
- a lens array or a rod integrator through which a beam from the beam combining portion is transmitted; and
- a condensing lens that condenses the beam transmitted through the lens array or the rod integrator,
- the beam combining portion including:
  - a first reflective section disposed on an optical axis of the first lamp unit and off an optical axis of the second lamp unit; and
  - a second reflective section disposed off the optical axis of the first lamp unit,
- wherein the first reflective section and the second reflective section reflect the beam emitted from the second lamp unit and being off the optical axis thereof to combine the beams emitted from the first and second lamp units, and
- wherein the optical axis of the first lamp unit is substantially perpendicular to the optical axis of the second lamp unit; and
- a projection optical system for projecting a beam from the illumination optical system.

11. The projection display apparatus according to claim 10, wherein the image modulation element comprises a liquid-crystal display element or a micro-mirror device.

12. An illumination optical system that illuminates an image modulation element, the illumination optical system comprising:
   a first lamp unit and a second lamp unit arranged substantially orthogonal to each other;
   a beam combining portion having a first reflective section and a second reflective section, the beam combining portion being configured to combine a beam emitted from the first lamp unit and a beam emitted from the second lamp unit;
   a lens array or a rod integrator through which a beam from the beam combining portion is transmitted; and
   a condensing lens configured to condense the beam transmitted through the lens array of the rod integrator,
   wherein an optical axis of the first lamp unit reflected by the beam combining portion and an optical axis of the second lamp unit passing through the beam combining portion are spaced apart from each other by a predetermined distance,
   wherein the first reflective section is disposed on the optical axis of the first lamp unit and off an optical axis of the second lamp unit, the second reflective section is disposed off the optical axis of the first lamp unit, and
   wherein the first reflective section and the second reflective section reflect the beam emitted from the second lamp unit and being off the optical axis thereof to combine the beams emitted from the first and second lamp units.

13. An illumination optical system that illuminates an image modulation element, the illumination optical system comprising:
   a beam combining portion that combines a beam emitted from a first lamp unit and a beam emitted from a second lamp unit, the first and second lamp units each including a lamp and a concave mirror, each lamp having a cathode and an anode arranged along an optical axis of the concave mirror; and
   a condensing lens that condenses a beam from the beam combining portion,
   the beam combining portion including:
      a first reflective section disposed on an optical axis of the first lamp unit and off an optical axis of the second lamp unit; and
      a second reflective section disposed off the optical axis of the first lamp unit,
   wherein the first reflective section and the second reflective section reflect the beam emitted from the second lamp unit and being off the optical axis thereof to combine the beams emitted from the first and second lamp units,
   wherein the beam combining portion further includes a first transmissive section and a second transmissive section, the second transmissive section being disposed on the optical axis of the second lamp unit,
   the first transmissive section, the first reflective section, the second transmissive section, and the second reflective section of the beam combining portion are arranged in this order from a first end to a second end, and
   when, in a cross section that contains the optical axis of the first lamp unit and the optical axis of the second lamp unit, two peaks of a light quantity distribution on a line that intersects the optical axis of the first lamp unit at an aperture plane of the first lamp unit are a first peak and a second peak and two peaks of a light quantity distribution on a line that intersects the optical axis of the second lamp unit at an aperture plane of the second lamp unit are a third peak and a fourth peak, the first transmissive section allows a beam corresponding to the first peak to be transmitted therethrough, the first reflective section reflects a beam corresponding to the fourth peak, the second transmissive section allows a beam corresponding to the second peak to be transmitted therethrough, and the second reflective section reflects a beam corresponding to the third peak.

14. A projection display apparatus comprising:
   an image modulation element;
   an illumination optical system that illuminates an image modulation element, the illumination optical system comprising:
   a beam combining portion that combines a beam emitted from a first lamp unit and a beam emitted from a second lamp unit, the first and second lamp units each including a lamp and a concave mirror, each lamp having a cathode and an anode arranged along an optical axis of the concave mirror;
   a lens array or a rod integrator through which a beam from the beam combining portion is transmitted; and
   a condensing lens that condenses the beam transmitted through the lens array or the rod integrator,
   the beam combining portion including:
      a first reflective section disposed on an optical axis of the first lamp unit and off an optical axis of the second lamp unit; and
      a second reflective section disposed off the optical axis of the first lamp unit,
   wherein the first reflective section and the second reflective section reflect the beam emitted from the second lamp unit and being off the optical axis thereof to combine the beams emitted from the first and second lamp units, and
   wherein the optical axis of the first lamp unit is substantially perpendicular to the optical axis of the second lamp unit; and
   a projection optical system for projecting a beam from the illumination optical system,
   wherein the following relationship is satisfied:

$$0 < P/L < 23$$

where L is an arc length of the lamp in the first or second lamp unit and P is a diagonal length of an image display region of the image modulation element.

15. An illumination optical system that illuminates an image modulation element, the illumination optical system comprising:
   a beam combining portion that combines a beam emitted from a first lamp unit and a beam emitted from a second lamp unit, the first and second lamp units each including a lamp and a concave mirror, each lamp having a cathode and an anode arranged along an optical axis of the concave mirror; and
   a condensing lens that condenses a beam from the beam combining portion,
   the beam combining portion including:
      a first reflective section disposed on an optical axis of the first lamp unit and off an optical axis of the second lamp unit; and
      a second reflective section disposed off the optical axis of the first lamp unit,
   wherein the first reflective section and the second reflective section reflect the beam emitted from the second lamp unit and being off the optical axis thereof to combine the beams emitted from the first and second lamp units, wherein the optical axis of the first lamp unit reflected by the beam combining portion and the optical axis of the second lamp unit passing through the beam combining portion are spaced apart from each other by a predetermined distance, wherein, when the concave mirror is a parabolic mirror having a focal length f, the following relationship is satisfied:

$$0<D<4f$$

where D is the predetermined distance, and wherein the optical axis of the first lamp unit is substantially perpendicular to the optical axis of second lamp unit.

16. An illumination optical system that illuminates an image modulation element, the illumination optical system comprising:
- a beam combining portion that combines a beam emitted from a first lamp unit and a beam emitted from a second lamp unit, the first and second lamp units each including a lamp and a concave mirror, each lamp having a cathode and an anode arranged along an optical axis of the concave mirror; and
- a condensing lens that condenses a beam from the beam combining portion, the beam combining portion including:
- a first reflective section disposed on an optical axis of the first lamp unit and off an optical axis of the second lamp unit; and
- a second reflective section disposed off the optical axis of the first lamp unit, wherein the first reflective section and the second reflective section reflect the beam emitted from the second lamp unit and being off the optical axis thereof to combine the beams emitted from the first and second lamp units, wherein the optical axis of the first lamp unit reflected by the beam combining portion and the optical axis of the second lamp unit passing through the beam combining portion are spaced apart from each other by a predetermined distance, wherein, when the concave mirror is an elliptic mirror having focal lengths $f1$ and $f2$, where $0<f1<f2$, the following relationship is satisfied:

$$0<D<4 \times f1 \times f2/(f1+f2)$$

where D is the predetermined distance, and wherein the optical axis of the first lamp unit and the optical axis of the second lamp unit are substantially perpendicular to each other.

* * * * *